(12) United States Patent
Codato et al.

(10) Patent No.: US 10,528,080 B2
(45) Date of Patent: Jan. 7, 2020

(54) SYSTEMS AND METHODS FOR PROVIDING DISPLAYS VIA A SMART HAND-STRAP ACCESSORY

(71) Applicant: Datalogic IP Tech, S.r.l., Bologna (IT)

(72) Inventors: Sandro Codato, Venice (IT); Franco Favaro, Venice (IT); Cinzia Cacciari, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 0 days.

(21) Appl. No.: 15/846,751

(22) Filed: Dec. 19, 2017

(65) Prior Publication Data

US 2019/0187753 A1    Jun. 20, 2019

(51) Int. Cl.
| | | |
|---|---|---|
| *G06K 7/10* | (2006.01) | |
| *G06F 1/16* | (2006.01) | |
| *G06F 3/0488* | (2013.01) | |
| *G06F 3/041* | (2006.01) | |
| *G06F 3/0481* | (2013.01) | |

(52) U.S. Cl.
CPC .......... *G06F 1/1626* (2013.01); *G06F 1/1643* (2013.01); *G06F 3/0416* (2013.01); *G06F 3/0488* (2013.01); *G06F 3/04817* (2013.01); *G06K 7/10386* (2013.01)

(58) Field of Classification Search
CPC .... G06F 1/163; G06F 13/4068; G06F 13/409; G06F 1/16; G06F 1/1637; G06F 1/1647; G06F 1/1652; G06F 1/1694; G06F 21/35; G06F 3/147; G06F 3/167
USPC .................................................. 235/462.44
See application file for complete search history.

(56) References Cited

U.S. PATENT DOCUMENTS

| | | | | |
|---|---|---|---|---|
| 4,087,864 A | * | 5/1978 | LaBove ............. | A41D 13/1245 2/102 |
| 4,825,471 A | * | 5/1989 | Jennings ................ | A41D 1/002 2/115 |
| 4,827,534 A | * | 5/1989 | Haugen ................. | H01L 31/042 136/291 |

(Continued)

OTHER PUBLICATIONS

V. Talla et al. "Wi-Fi RF energy harvesting for battery-free wearable radio platforms," 2015 IEEE International Conference on RFID (RFID), San Diego, CA, 2015, pp. 47-54.

(Continued)

*Primary Examiner* — Thien M Le
(74) *Attorney, Agent, or Firm* — Cozen O'Connor

(57) ABSTRACT

Systems and methods for an accessory that includes a supplemental display that can be used to present images, text, and other information. The accessory may include a strap that may be physically coupled along one surface of a hand-held processor-based terminal. A gap may be provided between the strap and the surface of the hand-held processor-based terminal that may be sized and dimensioned to receive a limb of a user. The supplemental display may be positioned along one surface of the strap to be visible when the limb of the user is inserted into the gap. The accessory may include a user input device, such as a user actuatable button, that may be used to receive inputs from the user. Such inputs may be used to control the images presented on the supplemental display and/or to trigger functions or processes on the hand-held processor-enable terminal.

20 Claims, 6 Drawing Sheets

(56) References Cited

U.S. PATENT DOCUMENTS

| | | | | |
|---|---|---|---|---|
| 4,845,650 | A | * | 7/1989 | Meade ............... G07B 1/00 101/66 |
| 5,078,134 | A | * | 1/1992 | Heilman ............ A61B 5/6831 600/508 |
| 5,305,244 | A | * | 4/1994 | Newman ............. G01R 1/025 704/E15.045 |
| 5,416,310 | A | * | 5/1995 | Little ............... G06F 1/163 2/102 |
| 7,236,751 | B2 | | 6/2007 | Ono |
| 8,552,877 | B2 | | 10/2013 | Martin et al. |
| 9,721,529 | B2 | | 8/2017 | Ackley et al. |
| 2014/0092108 | A1 | | 4/2014 | Moon et al. |
| 2016/0179337 | A1 | | 6/2016 | Ballesteros et al. |
| 2017/0076643 | A1 | | 3/2017 | Kaizu et al. |

OTHER PUBLICATIONS

K. Gudan et al. "Ultra-low power 2.4GHz RF energy harvesting and storage system with −25dBm sensitivity," 2015 IEEE International Conference on RFID (RFID), San Diego, CA, 2015, pp. 40-46.

S. Kim et al. "Ambient RF Energy-Harvesting Technologies for Self-Sustainable Standalone Wireless Sensor Platforms," in Proceedings of the IEEE, vol. 102, No. 11, pp. 1649-1666, Nov. 2014.

"Battery-free, energy harvesting Bluetooth low energy switch module employs Nordic Semiconductor's ultra low power nRF51822 SoC", Nov. 2016 [Online]. Available: https://rf-design.co.za/2016/11/18/battery-free-energy-harvesting-bluetooth-low-energy-switch-module-employs-nordic-semiconductors-ultra-low-power-nrf51822-soc/.

Measurement of power consumption of BLE (Bluetooth Low Energy). Helsinki Metropolia University of Applied Sciences. Bikash Shrestha thesis, https://publications.theseus.fi/bitstream/handle/10024/118662/Shrestha_Bikash.pdf?. sequence=1, Oct. 6, 2016.

RF Diagnostics, LLC "RFD102A Wireless Energy Harvesting Module" Retrieved from www.rfdiagnostics.com, http://www.rfdiagnostics.com/wp-content/uploads/2015/04/RFD102A_latest.pdf.

K. Gudan et al. "A 2.4GHz Ambient RF Energy Harvesting System with −20dBm Minimum Input Power and NiMH Battery Storage," 2014 IEEE International Conference on RFID Technologies and Applications (RFID-TA), Tampere, Finland, Sep. 2014.

P. Tenti "Internet of Energy, The revolution of distributed generation: from environmental energy harvesting to integration of renewables in smart micro-grids," Department of Information Engineering, University of Padova, [Online]. Available: http://www.iunet.eu/3rdIUNETday/Tenti.pdf.

Linear Technology, "Practical Design Considerations for Piezoelectric Energy Harvesting Applications," Mar. 2011, [Online]. Available: http://www.psma.com/sites/default/files/uploads/tech-forums-energy-harvesting/presentations/2011-apec-sp-113-practical-design-considerations-piezoelectric-energy-harvesting-applications.pdf.

B. Shrestha "Measurement of power consumption of BLE (Bluetooth Low Energy)," Helsinki Metropolia University of Applied Sciences, Oct. 2016.

RF Diagnostics, LLC "RFD102A Wireless Energy Harvesting Module" Retrieved from http://www.rfdiagnostics.com/wp-content/uploads/2015/04/RFD102A_latest.pdf.

Argenox "Powering Wireless and Bluetooth LE Products with Batteries" [Online] Retrieved from https://web.archive.org/web/20180318115742/http://argenox.com/bluetooth-low-energy-ble-v4-0-development/library/powering-ble-batt/.

* cited by examiner

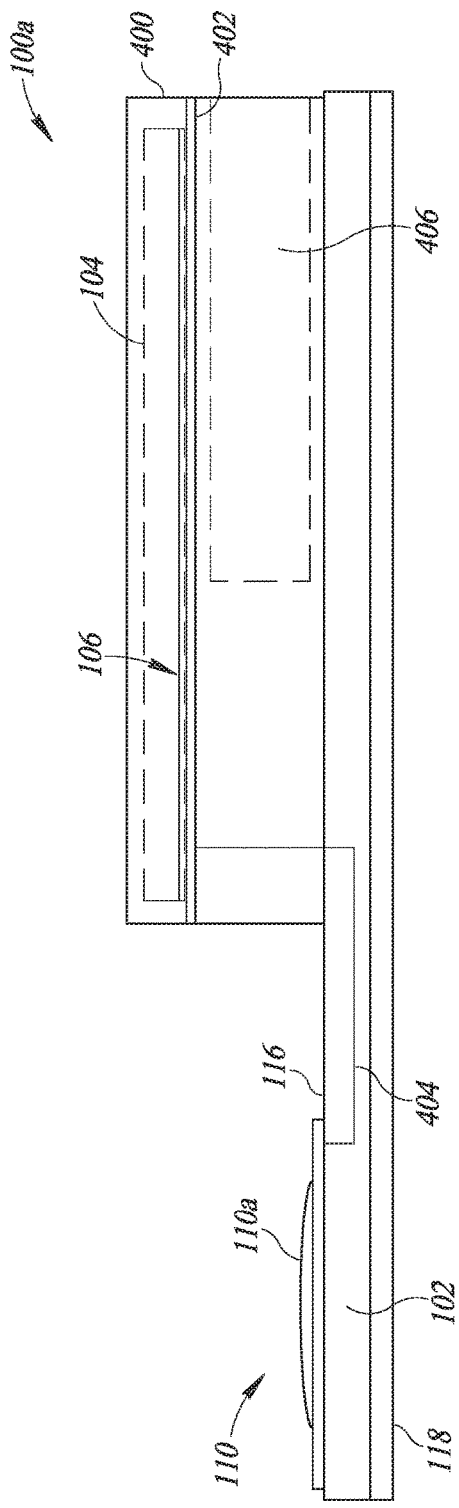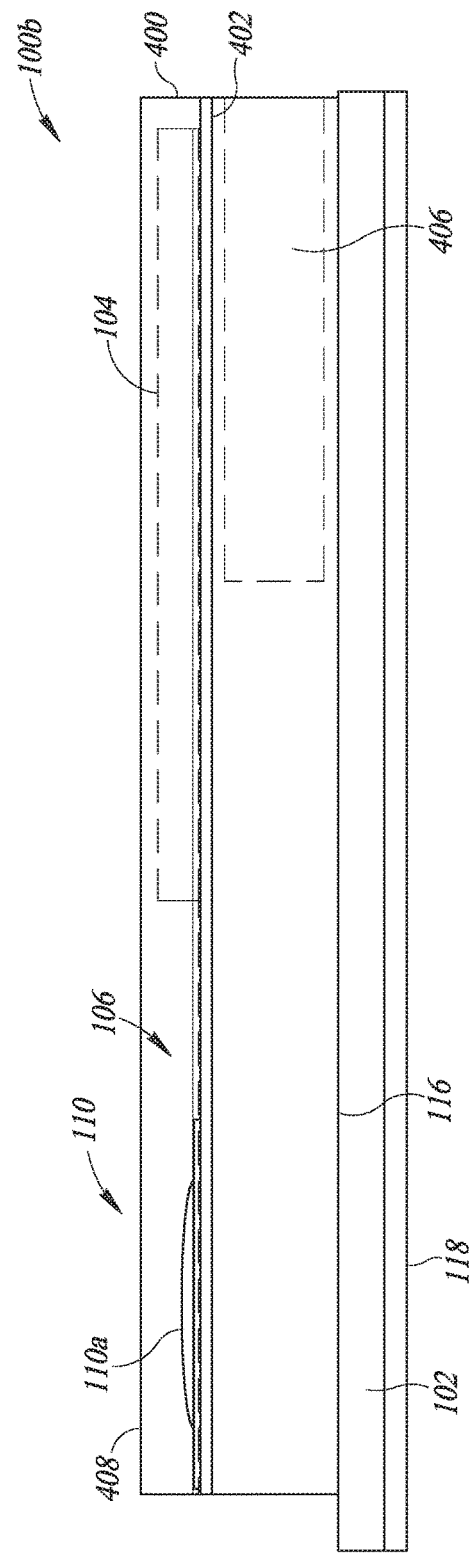

SYSTEMS AND METHODS FOR PROVIDING DISPLAYS VIA A SMART HAND-STRAP ACCESSORY

TECHNICAL FIELD

The present disclosure relates to an accessory for a hand-held processor-based terminal that may be used to provide information via a supplemental screen.

BACKGROUND

Description of the Related Art

Hand-held processor-based terminals are used in a wide variety of settings and industries to collect data and information. Such hand-held processor-based terminals may include various sensors and subsystems for data and information collection. In some situations, the hand-held processor-based terminals may be ergonomically designed to comfortably fit into the hand of a user. Such ergonomic designs may be particularly important for hand-held processor-based terminals that are held for long periods of time, such as, for example, may occur when workers use the hand-held processor-based terminals to scan deliveries and shipments for a package processing and/or shipping facility.

In some situations, the hand-held processor-based terminals may include an accessory, such as a strap, that extends across a portion of the hand-held processor-based terminal that may be used for safety and damage-prevention reasons. Such an accessory may be used, for example, to secure the hand-held processor-based terminal by the user to prevent the hand-held processor-based terminal from being dropped.

BRIEF SUMMARY

In some implementations, a conventional strap may obscure at least some of the surface of the hand-held processor-based terminal, thereby limiting the surfaces by which the hand-held processor-based terminal can provide information and feedback to the user. In addition, obscuring a portion of the surface of the hand-held processor-based terminal may reduce the available locations on the hand-held processor-based terminals for situating user input devices, such as user actuatable buttons, that may be used to capture data and information by the user.

An accessory for use with one or more hand-held processor-based terminals that have a length and a width, a front with a primary display and a back, and may be summarized as including a strap, the strap having a first major face, a second major face, a length, and a width; a supplemental display carried by the strap and viewable from the first major face; and at least one user input device operable to produce a signal in response to activation thereof; a controller carried by the strap, the controller communicatively coupleable to the one or more hand-held processor-based terminals and which is communicatively coupled to the supplemental display to control presentation of information thereby; and a set of couplers carried by the strap spaced along the length thereof and via which the accessory is physically coupleable to one of the hand-held processor-based terminals with the second major face of the strap facing the back of the one of the hand-held processor-based terminals and the first major face of the strap facing outwardly with the supplemental display visible, where a portion of the length of the strap between the couplers of the set of couplers is sized to provide a gap between the second major face of the strap and the back of the one of the hand-held processor-based terminals when the strap is physically coupled to the one of the hand-held processor-based terminals, the gap sized to receive at least a portion of a limb of a user therein to provide a secure engagement between the strap and the hand-held processor-based terminal and the portion of the limb of the user. The at least one user input device may be a user actuatable button. The at least one user input device may be a user actuatable button icon displayed on the supplemental display. The at least one hand-held processor-based terminal may be a machine-readable symbol reader, and in response to activation of the at least one user input device, the controller may cause a signal to be sent to the machine-readable symbol reader that causes the machine-readable symbol reader to read a machine-readable symbol in a field-of-view of the machine-readable symbol reader.

The accessory may further include at least one wired communications interface that provides wired communications between the controller and the at least one hand-held processor-based terminal when the strap is physically coupled to the at least one hand-held processor-based terminal.

The accessory may further include at least one wireless communications interface that provides wireless communications between the controller and the at least one hand-held processor-based terminal when the strap is within a defined spatial range of the at least one hand-held processor-based terminal. The set of couplers may detachably couple the strap to the one of the hand-held processor-based terminals.

The accessory may further include at least two contacts, the at least two contacts located opposite each other across the length of the strap, the at least two contacts which are electrically coupleable with corresponding contacts on the terminal. The at least two contacts may include an inductive charging interface. Each of the at least two contacts may be electrically coupled with the electronic display via a respective electrically conductive wire, the electrically conductive wire may have a wire length, and the wire length may be greater than a distance from the respective contact to a proximal edge of the controller. The electrically conductive wire may make a trace from the respective contact to the controller, and the trace may include at least one turn. The electrically conductive wire may be comprised of a conductive elastomer.

The accessory may further include a power management circuit, the power management circuit which is electrically coupled to the controller. The power management circuit may include at least one of a battery, a capacitor, and a power generation circuit. The power generation circuit may be comprised of at least one of a solar cell, a piezoelectric circuit, and a thermoelectric circuit. The information presented on the supplemental display may include at least one of a battery status, data regarding an operator of the terminal, and one or more alarms.

A hand-held processor-based terminal device may be summarized as including a hand-held processor-based terminal that has a length and a width, a front with a primary display and a back; and an accessory, the accessory including a strap, the strap having a first major face, a second major face, a length, and a width; a supplemental display carried by the strap and viewable from the first major face; and at least one user input device operable to produce a signal in response to activation thereof; a controller carried by the strap, the controller communicatively coupleable to the one or more hand-held processor-based terminals and which is communicatively coupled to the supplemental display to control presentation of information thereby; and a set of couplers carried by the strap spaced along the length thereof and via which the accessory is physically coupleable to one of the hand-held processor-based terminals with the second major face of the strap facing the back of the one of the hand-held processor-based terminals and the first major face of the strap facing outwardly with the supplemental display visible, where a portion of the length of the strap between the couplers of the set of couplers is sized to provide a gap between the second major face of the strap and the back of the one of the hand-held processor-based terminals when the strap is physically coupled to the one of the hand-held processor-based terminals, the gap sized to receive at least a portion of a limb of a user therein to provide a secure engagement between the strap and the hand-held processor-based terminal and the portion of the limb of the user.

A method of operation of an accessory that presents information using a supplemental display on an accessory, the accessory which is for use a hand-held processor-based terminal that have a length and a width, a front with a primary display and a back, and a processor, the accessory which includes a strap, the supplemental display, a controller, and a set of couplers carried by the strap, the strap having a first major face, a second major face, a length, and a width, the strap which is coupleable to the hand-held processor-based terminal via the set of couplers, the set of couplers which are spaced along the length of the strap such that a portion of the length of the strap between the couplers of the set of couplers is sized to provide a gap between the second major face of the strap and the back of the hand-held processor-based terminal when the strap is physically coupled to the hand-held processor-based terminals, may be summarized as including receiving by the controller on the accessory one or more signals transmitted from the processor in the hand-held processor-based terminal; determining one or more images to be presented on the supplemental display based at least in part upon the received one or more signals; and transmitting one or more signals to the supplemental display, the one or more signals which cause the determined image to be presented by the supplemental display.

The accessory may further include a user input device and the method may further include receiving by the controller on the accessory a signal transmitted by the user input device; and determining one or more images to be presented on the supplemental display based at least in part upon signal received from the user input device.

The accessory may further include a machine-readable symbol reader and a user input device and the method may further include receiving by the controller on the accessory a signal transmitted by the user input device; and transmitting a signal to the machine-readable symbol reader that causes the machine-readable symbol reader to read a machine-readable symbol in a field-of-view of the machine-readable symbol reader.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 4A is a schematic diagram of an accessory for use with a hand-held processor-based terminal in which the accessory includes a user input device that is a user actuatable button that is exposed along a portion of a strap, according to at least one illustrated implementation.

FIG. 4B is a schematic diagram of an accessory for use with a hand-held processor-based terminal in which the accessory includes a user input device that is a user actuatable button that is covered by a flexible covering, according to at least one illustrated implementation.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with scan engines, imagers, decoding circuitry, and/or machine-readable symbol readers have not been shown or described in detail to avoid unnecessarily obscuring descriptions of the implementations.

Unless the context requires otherwise, throughout the specification and claims that follow, the word "comprising"

is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
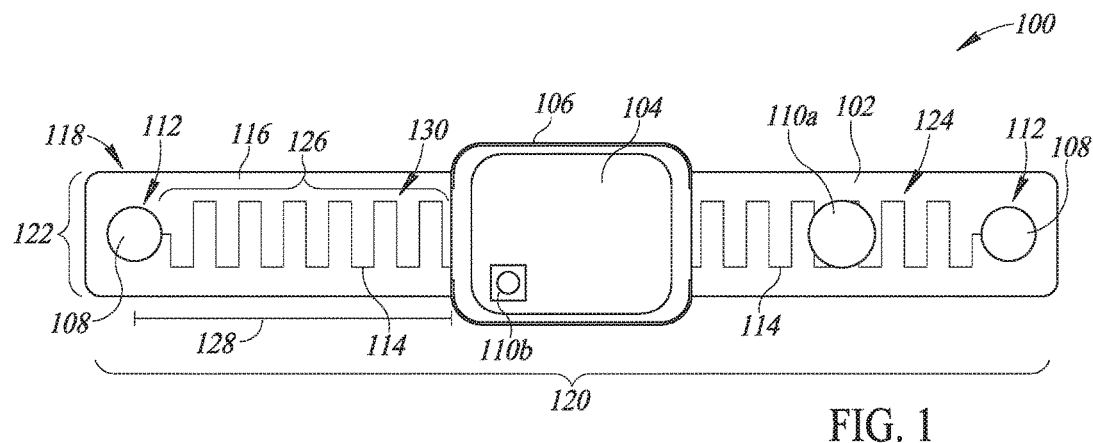
FIG. 1 is a schematic diagram of an accessory for use with a hand-held processor-based terminal, in which the accessory includes a strap that carries a supplemental display and a controller, and that physically couples to the hand-held processor-based terminal via a set of one or more couplers, according to at least one illustrated implementation.

FIG. 1 shows an accessory 100 for use with a hand-held processor-based terminal (not shown), in which the accessory 100 includes a strap 102 that carries a supplemental display 104 and a controller 106, and that physically couples to the hand-held processor-based terminal via a set of one or more couplers 108, according to at least one illustrated implementation. In some implementations, the accessory 100 may include a user input device 110 that may be used to produce one or more signals when activated, such as may occur, for example, when a user depresses or holds the user input device 110. In some implementations, the accessory 100 may include one or more electrical contacts 112. Such electrical contacts 112 may be used to electrically couple the accessory 100 to an external power supply that may be located, for example, on the hand-held processor-based terminal. For example, the accessory may include one or more snap type fasteners that detachably couple to complementary portions of the hand-held processor-based terminal. Such fasteners may include one or more electrical contacts 112 that may electrically couple with corresponding electrical contacts on the hand-held processor-based terminal to thereby provide an electrically conductive path between the hand-held processor-based terminal and the accessory 100. Such electrical contacts 112 may be electrically coupled with a controller 106 via one or more electrically conductive wires 114.

The strap 102 may include a first major face 116, a second major face 118, a length 120, and a width 122. The first major face 116 may be positioned to face away from the hand-held processor-based terminal when the accessory 100 is physically coupled to the hand-held processor-based terminal. As such, the first major face 116 may carry the supplemental display 104. In such an implementation, the second major face 118 may be positioned to face towards the hand-held processor-based terminal when the accessory 100 is physically coupled to the hand-held processor-based terminal. The strap 102 may be comprised of a durable fabric (e.g., woven nylon), a plastic or plastic-related material, leather, or any other type of durable material. In some implementations, the strap 102 may be comprised of a flexible material that may be stretched to elongate one or both of the length 120 and/or the width 122 of the strap 102.

In some implementations, the strap 102 may be comprised of a rigid material in which neither the length 120 nor the width 122 is expandable.

The supplemental display 104 may be carried along the first major face 116 of the strap 102. As such, the supplemental display 104 may face outward, away from the hand-held processor-based terminal, when the accessory 100 is physically coupled to the hand-held processor-based terminal. The supplemental display 104 may be comprised of an electronic screen that may be used to render images upon the supplemental display 104. Such images may be comprised of any one or more of text, pictures, diagrams, graphs, or any other type of visual representation of data and/or information. The supplemental display 104 may be comprised of any type of electronically controllable display in which one or more signals (e.g., such as signals received from the controller 106) may be used to control and modify the images being rendered upon the supplemental display 104. In some implementations, for example, the supplemental display 104 may be comprised of a type of liquid crystal display ("LCD"), a type of light emitting diode ("LED") display such as an organic LED ("OLED") display or a MicroLED display, or any other type of electronically controllable screen, such as a dot matrix display screen. In some implementations, for example, the supplemental display 104 may be comprised of an electronic ink ("e-ink") display that may be used to provide images to the supplemental display 104 based upon one or more signals, such as those that might be received from the controller 106. In some implementations, an LED display may be used with another type of display (e.g., a dot matrix display) such that the LED display may be used to highlight portions of the supplemental display 104, such as may occur, for example, to highlight an alarm being presented on the supplemental display 104.

The controller 106 may be carried along at least one of the faces of the strap 102. In some implementations, the controller 106 may be communicatively coupleable to a remote device, such as the hand-held processor-based terminal. In some implementations, the controller 106 may be communicatively coupled to the supplemental display 104. As such, the controller 106 may transmit data to the hand-held processor-based terminal and may receive signals from the hand-held processor-based terminal that may provide information, images, or other data that may be displayed on the supplemental display 104. In such an implementation, the controller 106 may control the presentation of information by the supplemental display 104. In some implementations, the controller 106 may control the presentation of information by the supplemental display 104 based upon one or more signals received from the user input device, as discussed below. Such information may include, for example, battery status or charge for the accessory 100, helpful telephone numbers or other contact information that may be used by the user, the name and/or contact information of the user, a name of a customer, and/or reminders or calendared events. In some implementations, some or all of the display presented on the supplemental display 104 may not be controlled or changeable by the user.

The controller 106 may take the form of any current or future developed processor-enabled device capable of executing one or more instruction sets. The controller 106 may include one or more processing units to execute one or more processor-readable instructions, instruction sets, or instruction blocks. The controller 106 may include a system memory to store one or more processor-readable instructions, instruction sets, or instruction blocks to be executed by the processor. In some implementations, the system memory may be embedded with the processing unit. Such processor-readable instructions, instruction sets, or instruction blocks may be used to render images on the supplemental display 104. In some implementations, such images may be rendered on the supplemental display 104 using a firmware implementation, or some other similar type of implementation. In some implementation, the controller 106 may be communicatively coupled with other devices, such as the hand-held processor-based terminal via a communications link using one or more wireless and/or wired communications protocols, such as, for example, Wi-Fi, Ethernet, Bluetooth, ZigBee or any other acceptable communication protocol.

The set of one or more couplers 108 may be used to physically detachably couple the accessory 100 to a portion of the hand-held processor-based terminal. In some implementations, a set of two couplers 108 may be spaced along the length 120 of the strap 102, and located along the second major face 118 of the strap 102 such that the couplers 108 may be facing towards the hand-held processor-based terminal when the accessory 100 is physically coupled to the hand-held processor-based terminal. In such an implementation, for example, one coupler 108 located proximate one edge of the strap 102 and the other coupler 108 located proximate an opposite edge of the strap 102 across the length 120. Each coupler in the set of couplers 108 may physically couple to a corresponding coupler located on the hand-held processor-based terminal. Such couplers 108 on the accessory 100 may include, for example, latches, snaps, Velcro, tabs, magnets. Corresponding and complimentary couplers may be spaced along the hand-held processor-based terminal. In some implementations, such as when the couplers 108 are magnetic, the set of one or more couplers 108 may be used to communicatively couple the accessory 100 to the hand-held processor-based terminal. In such an implementation, an inductive coupling between corresponding magnets may be used to transmit data using, for example, Near Field Communication ("NFC") transmissions between the accessory 100 and the hand-held processor-based terminal.

The user input device 110 that may be used to produce one or more signals when activated, such as may occur, for example, when a user depresses or holds the user input device 110. In some implementations, the user input device 110 may be comprised of one or more user actuatable buttons 110a or switches that extend outward from the first major face 116 of the strap 102. In such an implementation, the user input device 110 may be positioned along the strap 102 in a location at, or proximate to, which the thumb, or other finger, of the user may rest when the hand of the user is positioned between the accessory 100 and the hand-held processor-based terminal. As such, the user may be able to locate and depress the user input device 110 through feel, without the need to visually identify and/or locate the user input device 110. In some implementations, the user input device 110 may be comprised of a "soft" button such as a user actuatable button icon 110b that is rendered on a portion of the supplemental display 104.

The user input device 110 may generate one or more signals when activated (e.g., depressed). Such signals may be received by the controller 108 and used to trigger one or more functions, applications, and/or operations to be executed by the accessory 100 and/or the hand-held processor-based terminal. For example, in some implementations, the accessory 100 may be physically coupled to a machine-readable symbol reader. In such an implementation, the user input device 110 may generate a signal when activated that results in the machine-readable symbol reader capturing an image of a machine-readable symbol that is to be decoded. In some implementations, the user input device 110 may be used to control the display of information on the supplemental display 104. For example, in some implementations, the user input device 110 may include two separate inputs. Such separate inputs may be used, for example, to provide a scroll up and a scroll down functionality for the information, such as text, that is rendered on the supplemental display 104. The one or more electrical contacts 112 may be used to receive electrical power from an outside source, such as, for example, from the hand-held processor-based terminal. In some implementations, the electrical contacts 112 may be spaced along the length 120 of the strap 102, and located along the second major face 118 of the strap 102 such that the electrical contacts 112 may be facing towards the hand-held processor-based terminal when the accessory 100 is physically coupled to the hand-held processor-based terminal. In some implementations, each of the electrical contacts 112 may be incorporated into respective ones of the couplers 108. In some implementations, the electrical contacts 112 may be inductive contacts that electrically couple with corresponding inductive couplers on the hand-held processor-based terminal to receive power. As such, the electrical contacts 112 may be low-power, current-limited electrical contacts.

The power received from the hand-held processor-based terminal may be transmitted from the electrical contacts 112 to the controller 106 and/or the supplemental display 104 via the electrically conductive wires 114. Such electrically conductive wires 114 may be comprised of electrically conductive material that may be stretched without breaking or damage. Such electrically conductive wires 114 may be incorporated into, and thereby surrounding by, the strap 102. In some implementations, the electrically conductive wires 114 may be comprised of harmonic steel materials and/or of copper or other electrically conductive metals that may return to an original, non-stressed state after being elongated and/or compressed. In such an implementation, the electrically conductive wires 114 may follow a trace 124 between the electrical contacts 112 and the controller 106 and/or the supplemental display 104 in which the trace 124 may be comprised of a wire length 126. In such an implementation, the wire length 126 that forms the trace 124 may be greater than a corresponding straight-line distance 128 between the respective electrical contact 112 and the corresponding proximate edge of the controller 106 and/or supplemental display 104. In such an implementation, the trace 124 may include one or more turns 130 in which the trace 124 changes directions. In such an implementation, the trace 124 may stretch and/or bend with the strap 102 to reduce the strain on the electrically conductive wires 114 during use of the accessory 100.

In some implementations, the electrically conductive wires 114 may be comprised of a conductive elastomer. In such an implementation, the conductive elastomers may be stretched and/or compressed without resulting in damage, such that the trace 124 followed by the electrically conductive wires 114 may be a straight line between the respective electrical contact 112 and the corresponding proximate edge of the controller 106 and/or supplemental display 104.

Figure 2:
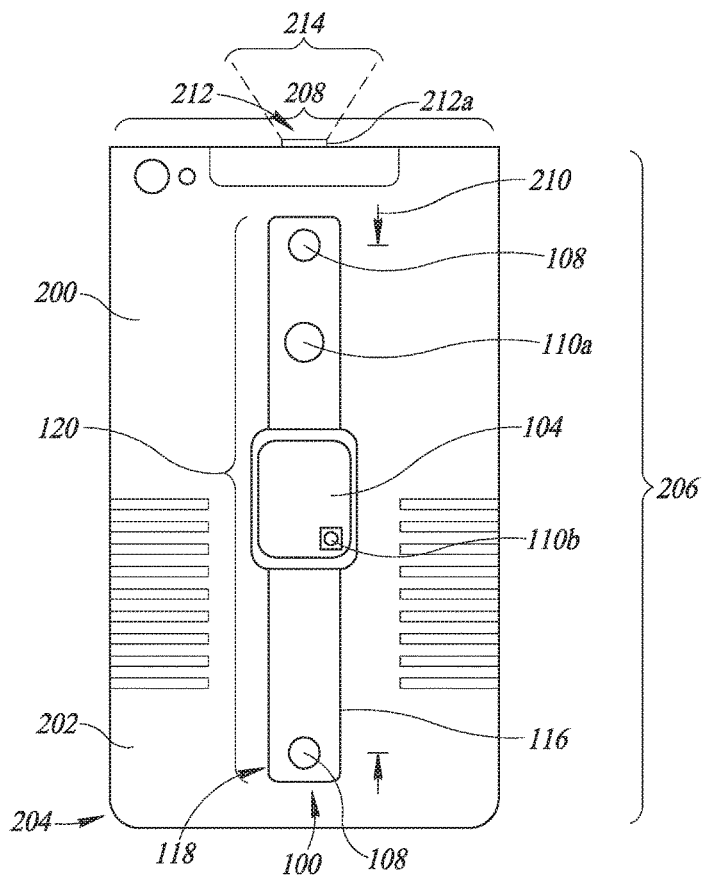
FIG. 2 is a top plan view of an accessory that is physically coupled to a hand-held processor-based terminal such that a supplemental display is visible, according to at least one illustrated implementation.

FIG. 2 shows the accessory 100 that is physically coupled to a hand-held processor-based terminal 200 such that the supplemental display 104 is visible, according to at least one illustrated implementation. The hand-held processor-based terminal 200 may include a back 202 and a front 204, and have a length 206 and a width 208. The front 204 of the hand-held processor-based terminal 200 may include a primary display (not shown) that may be used to provide information to, and receive input from, the user. In some implementations, the hand-held processor-based terminal 200 may have a size and shape that corresponds to a smartphone or other such portable consumer device. In some implementations, the hand-held processor-based terminal 200 may include an image sensor 212, such as a machine-readable symbol reader 212a, that may be used to capture and decode machine-readable symbols that are within a field-of-view 214 of the image sensor 212. Such a capture and decode may be triggered, for example, when the user input device 110 (e.g., the user actuatable button 110a) is activated, resulting in a signal being transmitted from the accessory 100 to the hand-held processor-based terminal 200. Such machine-readable symbols may be one-dimensional (e.g., barcode symbols) or two-dimensional machine-readable symbols (e.g., area or matrix code symbols). Machine-readable symbols are based on machine-readable symbologies (e.g., Code 39, Code 128, EAN13, Code 93, DataMatrix, PDF 417, QR Code) which define respective mappings between areas of high and low reflectance and human understandable characters (e.g., alphanumeric, extended ASCII). In such implementations, the processor for the hand-held processor-based terminal 200 may transmit information to the controller 106 to be presented on the supplemental display 104 based upon the information decoded from the machine-readable symbol.

The set of couplers 108 may be positioned to physically couple with corresponding couplers on the back 202 of the hand-held processor-based terminal 200 to thereby secure the accessory 100 to the back 202 of the hand-held processor-based terminal 200. When the accessory 100 and the hand-held processor-based terminal 200 are so coupled, the length 120 of the accessory 100 may be oriented to extend at least part of the length 206 of the hand-held processor-based terminal 200. In some implementations, the corresponding couplers on the back 202 of the hand-held processor-based terminal 200 may be spaced such that a distance 210 between the corresponding couplers is less than a distance between the set of couplers 108 spaced along the strap 102 of the accessory 100 when the strap 102 is fully extended. In such an implementation, the strap 102 may have some slack between the second major face 118 of the strap 102 and the back 202 of the hand-held processor-based terminal 200 when the accessory 100 is physically coupled to the back 202 of the hand-held processor-based terminal 200. As such, the slack may be used to receive at least a portion of a limb of a user, such as, for example, the palm or hand of the user, as discussed below, between the second major face 118 of the strap and the hand-held processor-based terminal 200. As such, the supplemental display 104 may be visible when the user has inserted a limb through the gap. The amount of slack for the strap 102 may be based, at least in part, on the elasticity of the material comprising the strap 102.

Figure 3:
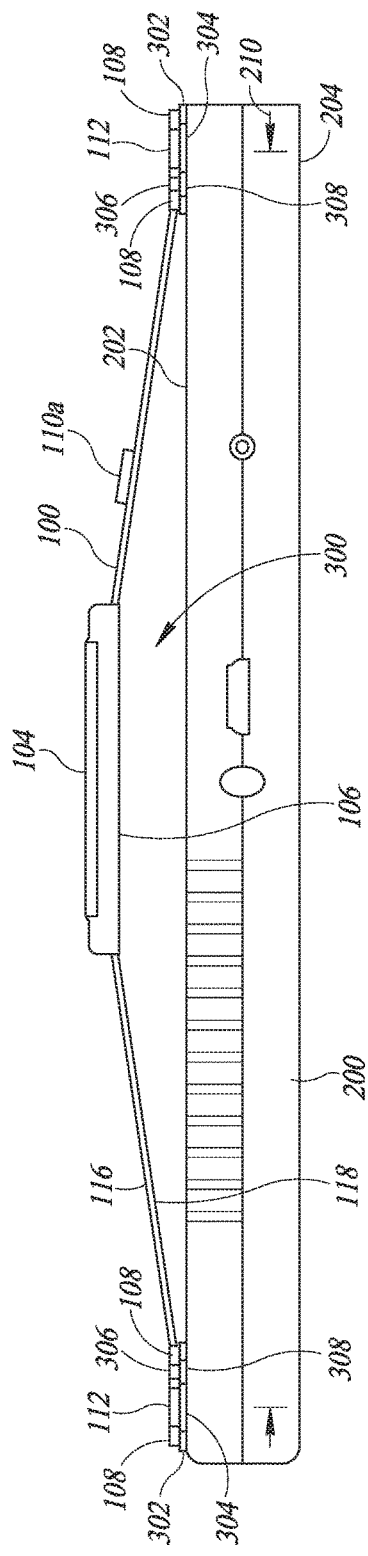
FIG. 3 is a side elevational view of the accessory physically coupled with the hand-held processor-based terminal of FIG. 2 in which a gap exists between the accessory and the hand-held processor-based terminal, according to at least one illustrated implementation.

FIG. 3 shows the accessory 100 physically coupled with the hand-held processor-based terminal 200 in which a gap 300 exists between the accessory 100 and the hand-held processor-based terminal 200, according to at least one illustrated implementation. As noted above, the set of couplers 108 for the accessory 100 may be aligned with and coupled to corresponding couplers 302 on the back 202 of the hand-held processor-based terminal 200. Such couplers 302 on the back 202 of the hand-held processor-based terminal 200 may include, for example, one or more of latches, snaps, Velcro, tabs, magnets, and/or apertures that complement the corresponding coupler 108 on the strap 102.

In some implementations, such coupling may make the accessory 100 selectively detachable from the hand-held processor-based terminal 200. Such a feature may advantageously enable the accessory 100 to be updated and/or swapped out. In some implementations, the coupling may make the accessory 100 permanently attached to the hand-held processor-based terminal 200, such as may occur, for example, when the coupling is accomplished using rivets or other similar coupling components. Such permanent coupling may be advantageous to prevent the accessory 100 from becoming separated from the hand-held processor-based terminal 200 and thereby lost or misplaced.

The distance 210 between the couplers 302 on the hand-held processor-based terminal 200 may be less than the distance between the couplers 108 on the strap 102 when the strap 102 is fully extended. As such, the strap 102 may have some slack between the second major face 118 of the strap 102 and the back 202 of the hand-held processor-based terminal 200 when the couplers 108 on the accessory 100 are physically coupled to the corresponding couplers 302 located on the back 202 of the hand-held processor-based terminal 200. As such, the slack may be used to provide the gap 300 between the second major face 118 of the accessory 100 and the back 202 of the hand-held processor-based terminal 200. The gap 300 may be used to receive at least a portion of a limb of a user, such as, for example, the palm or hand of the user, as discussed below, between the second major face 118 of the accessory 100 and back 202 of the hand-held processor-based terminal 200. As such, the supplemental display 104 may be visible when the user has inserted a limb through the gap.

In some implementations, the back 202 of the hand-held processor-based terminal 200 may include one or more electrical interfaces 304 that may electrically couple with the corresponding electrical contacts 112 on the strap 102. In such an implementation, for example, the electrical interfaces 304 may include one or more inductive interfaces that may electrically, inductively couple with the corresponding electrical contacts 112 on the strap 102. In some implementations, at least one of the electrical interfaces 304 and the electrical contacts 112 may include a type of electrical connector (e.g., a bayonet style electrical connector) and the other of the electrical interfaces 304 and the electrical contacts 112 may be a corresponding electrical receptacle. In some implementations, the respective electrical interfaces 304 on the hand-held processor-based terminal 200 may be located proximate the couplers 302 on the back 202 of the hand-held processor-based terminal 200. As such, the physically coupling by the couplers 302 on the hand-held processor-based terminal 200 and the couplers 108 on the accessory 100 may be used to maintain the electrical contact between the electrical interfaces 304 and the electrical contacts 112.

In some implementations, the electrical coupling between the electrical interfaces 304 and the electrical contacts 112 may be used to wake up and/or activate the controller 106 on the accessory 100. In some implementations, for example as discussed below, the accessory 100 may include internal power storage in which case the controller 106 may be placed in a stand-by mode powered by the internal power storage when the accessory 100 is not electrically coupled to the hand-held processor-based terminal 200. The accessory 100 may draw minimal power when in the stand-by mode. When the controller 106 senses the presence of a voltage on the electrical contacts 112, the controller 106 may wake up to begin operating. In instances in which the accessory 100 has no internal power storage, or the internal power storage supply has been depleted, the controller 106 may perform a "cold boot" when voltage is supplied via the electrical contacts 112.

In some implementations, the accessory 100 may further include a wired communications interface 306 that may communicatively couple with a corresponding wired communications interface 308 on the hand-held processor-based terminal 200. In some implementations, the wired communications interface 306 may be located along the second face 118 of the strap 102 proximate one coupler in the set of couplers 108, and the wired communications interface 308 may be located along the back 202 of the hand-held processor-based terminal 200 proximate the corresponding coupler 302. In such an implementation, the physical coupling between the coupler 108 on the strap 102 and the corresponding coupler 302 on the back 202 of the hand-held processor-based terminal 200 may be used to maintain the communicative coupling between the wired communications interfaces 306, 308. In some implementations, the wired communications interface 306 on the accessory 100 and the wired communications interface 308 on the hand-held processor-based terminal 200 may be comprised of corresponding inductive interfaces on the accessory 100 and the hand-held processor-based terminal 200. Such corresponding inductive interfaces may be used to communicatively couple the accessory 100 and the hand-held processor-based terminal 200 when the corresponding inductive interfaces are inductively coupled using, for example, NFC transmissions. In some implementations, the wired communications interface 306 on the accessory 100 and the wired communications interface 308 on the hand-held processor-based terminal 200 may be comprised of corresponding connectors that may be used to communicatively couple the accessory 100 and the hand-held processor-based terminal 200. For example, in some implementations, the wired communications interface 306 on the accessory may be comprised of a Universal Serial Bus ("USB") plug and the wired communications interface 308 on the hand-held processor-enabled terminal may be comprised of a corresponding USB receptacle. As such, the accessory 100 and the hand-held processor-enabled terminal 200 may be communicatively coupled when the USB plug on the accessory 100 is mated with the USB receptacle on the hand-held processor-enabled terminal 200. Other types of communication connectors may be used to communicatively couple the accessory 100 and the hand-held processor-based terminal 200. As such, communications between the accessory 100 and the hand-held processor-based terminal 200 may be via the wired communicative coupling.

Figure 4C:
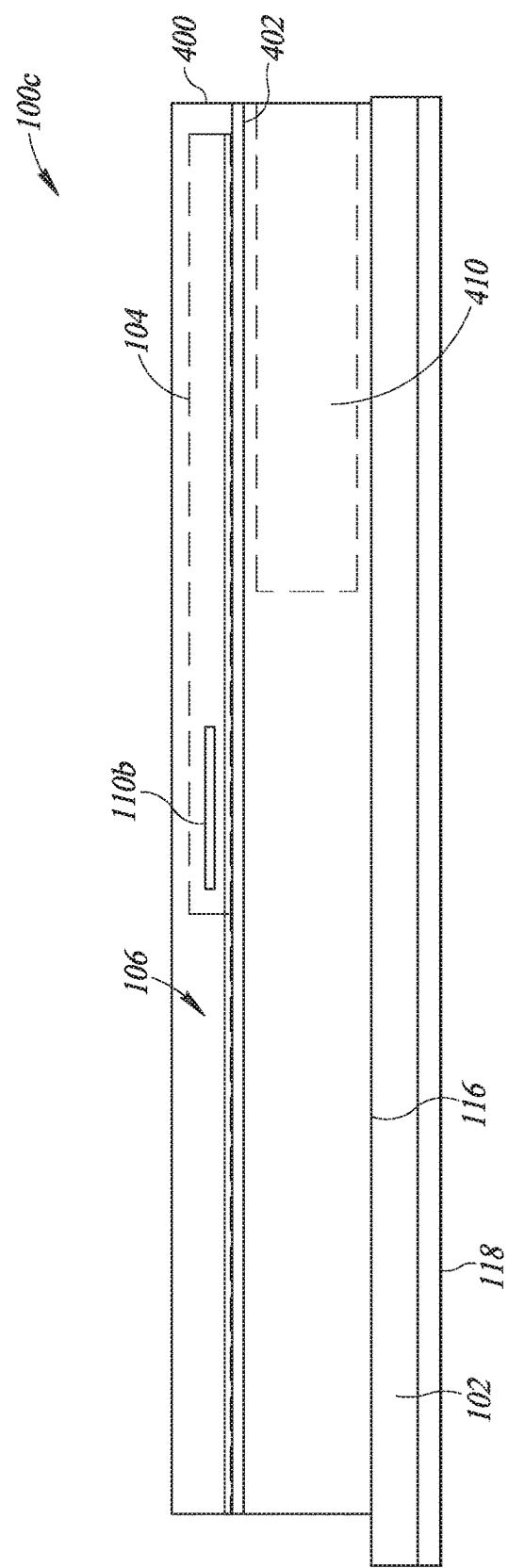
FIG. 4C is a schematic diagram of an accessory for use with a hand-held processor-based terminal in which the accessory includes a user input device that is a user actuatable button icon, and in which the accessory includes a rechargeable power supply component, according to at least one illustrated implementation.

FIGS. 4A, 4B, and 4C show different types of the accessory 100a, 100b, 100c (collectively, "accessory 100") for use with the hand-held processor-based terminal 200. Each accessary 100 may include a frame 400 that may be mounted on the first major surface 116 of the strap 102. Such a frame 400 may be physically coupled to the strap 102 using, for example, an adhesive, Velcro, stitching, and/or any other type of coupling material or component. In some implementations, the frame 400 may be used to house the supplemental display 104 along with the controller 106. In some implementations, the controller may be comprised of a printed circuit board 402 along with associated electronic components that may physically, electrically coupled to the printed circuit board 402. In some implementations, the supplemental display 104 may be mounted above the printed circuit board 402. In some implementations, the supplemental display 104 may extend across some or all of the printed circuit board 402. Such a frame 400 may be comprised of a durable, resilient material that may be used to protect the supplemental display 104 and/or the controller 106. Such material may include, for example, a plastic and/or a metal.

FIG. 4A shows a first type of accessory 100a in which the user input device 110 may include a user actuatable button 110a that is located along the first major surface 116 of the strap 102, proximate the display 104. The user actuatable button 110a may be electrically and communicatively coupled to the printed circuit board 402 via an electrical connection 404. In some implementations, the user actuatable button 110a may include a push button, a rocker switch, or any other type of user actuatable button 110a that may be activated by the user. In some implementations, activating the user actuatable button 110a may cause a signal to be transmitted from the user actuatable button 110a to the printed circuit board 402. Such signals received from the user actuatable button 110a may be used by the controller 106 to control the display presented on the supplemental display 104. In some implementations, the signals received from the user actuatable button 110a may be used by the hand-held processor-based terminal 200 to control one or more functions, processes, and/or operations by the hand-held processor-based terminal 200. The first type of accessory 100a may include a slot 406 that may be used to receive a removable power supply, such as a coin-type of battery.

FIG. 4B shows a second type of accessory 100b in which the user input device 110 may include a user actuatable button 110a that is located along the frame 400, proximate the display 104. The user actuatable button 110a may be mounted on, and thereby communicatively coupled to, the printed circuit board 402. In some implementations, the user actuatable button 110a may include a push button, a rocker switch, or any other type of user actuatable button 110a that may be activated by the user. In some implementations, the user actuatable button 110a may be covered by a flexible cover 408 that may enable the user actuatable button 110a to be pressed or otherwise activated by pressing the flexible cover 408. Such a flexible cover 408 may be comprised, for example, of a pliable plastic cover that may extend across and cover the user actuatable button 110a. Such a flexible cover 408 may thereby prevent foreign objects from interfering with the user actuatable button 110a. In some implementations, activating the user actuatable button 110a may cause a signal to be transmitted from the user actuatable button 110a to the printed circuit board 402. Such signals received from the user actuatable button 110a may be used by the controller 106 to control the display presented on the supplemental display 104. In some implementations, the signals received from the user actuatable button 110a may be used by the hand-held processor-based terminal 200 to control one or more functions, processes, and/or operations by the hand-held processor-based terminal 200. The second type of accessory 100b may include a slot 406 that may be used to receive a removable power supply, such as a coin-type of battery.

FIG. 4C shows a third type of accessory 100c in which the user input device 110 may include a supplemental display 104 that is included within the frame 400. The supplemental display 104 may be used to present the user actuatable button icon 110b that may receive inputs, such as, for example, form the user. The supplemental display 104 may be mounted on, and thereby communicatively coupled to, the printed circuit board 402. As such, the supplemental display 104 may transmit one or more signals to the printed circuit board 402 when an input is received from the user actuatable button icon 110b. Such signals received via the user actuatable button icon 110b may be used by the controller 106 to control the display presented on the supplemental display 104. In some implementations, the signals received from the user actuatable button icon 110b may be used by the hand-held processor-based terminal 200 to control one or more functions, processes, and/or operations by the hand-held processor-based terminal 200. The third type of accessory 100c may include a slot 410 that may be used to receive a removable and/or rechargeable power supply. In some implementations, the rechargeable battery may be recharged by one or more recharging circuit components, such as a solar cell, that may be located on the accessory 100c.

Figure 5:
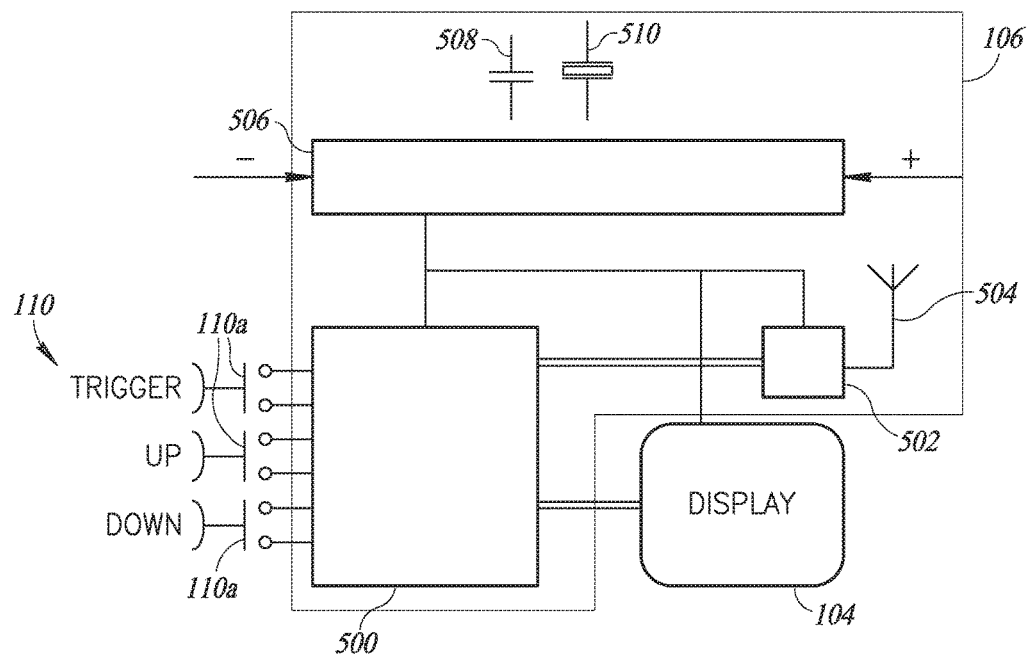
FIG. 5 is a block diagram that shows a controller that may include a processor, a communications subsystem, an antenna, and a power management subsystem, according to at least one illustrated implementation.

FIG. 5 shows a controller 106 that may include a processor 500, a communications subsystem 502, an antenna 504, and a power management subsystem 506, according to at least one illustrated implementation. The controller 106 may take the form of any current or future developed computing system capable of executing one or more instruction sets. In some implementations, the controller 106 may be electrically and/or communicatively coupled to the supplemental display 104. As such, one or more components of the controller (e.g., the processor 500) may control the images and other information presented on the supplemental display 104. In some implementations, the controller 106 may receive input from one or more user input devices 110. Such input may include one or more signals that may be transmitted from the user input devices 110 to the processor 500 of the controller 106 when the user input devices 110 are activated. In such an implementation, such user input devices 110a may include one or more user actuatable buttons 110a that may each generate a respective signal when the associated user actuatable button 110a is activated (e.g., depressed) to electrically couple two electrical contacts. Such signals from the user actuatable buttons 110a may be used, for example, to activate a function, process, and/or operation on the accessory 100 and/or the hand-held processor-based terminal 200 (e.g., to trigger a scan operation by the image sensor 212). Such signals from the user actuatable buttons 110a may be used, for example, to control the images and information presented on the supplemental display 104, such as, for example, by controlling a scroll up and/or a scroll down functionality. In some implementations, some or all of the components of the controller 106 may be physically, electrically, and communicatively coupled to a printed circuit board, such as printed circuit board 402.

The controller 106 will at times be referred to in the singular herein, but this is not intended to limit the embodiments to a single system, since in certain embodiments, as there will be more than one system or other networked computing device involved. Non-limiting examples of commercially available systems include, but are not limited to, STM32 by ST Microelectronics or a Snapdragon processor as offered by Qualcomm, Inc., for example.

The processor 500 may be any logic processing unit, such as one or more central processing units (CPUs), microprocessors, digital signal processors (DSPs), application-specific integrated circuits (ASICs), field programmable gate arrays (FPGAs), programmable logic controllers (PLCs), etc. Unless described otherwise, the construction and operation of the various blocks shown in FIG. 5 are of conventional design. As a result, such blocks need not be described in further detail herein, as they will be understood by those skilled in the relevant art. In some implementations, the processor 500, associated memory, and one or more other components discussed below may be included within a single integrated circuit, such as may occur, for example, with a system on chip (SoC). In some implementations, the processor 500 may include a low-power stand-by status that may be entered when the accessory 100 is not electrically coupled to an external power source via, for example, the electrical contacts 112. In such a stand-by status, the processor 500 and other components of the controller 106 may use minimal power from an internal power source, such as, for example, a battery. When the accessory 100 is electrically coupled to an external power source, an interrupt may be generated that wakes-up the processor 500. In implementations in which the accessory 100 includes no internal power storage, the processor 500 may perform a "cold boot" when the accessory is electrically coupled to an external power source.

The communications subsystem 502 may be communicatively coupled to the antenna 504. The antenna 504 may be any type of component or set of components that have a resonant frequency. In some implementations, the antenna 504 may comprise an inductor and one or more sets of circuitry to form a resonant circuit having a resonant frequency. Such sets of circuitry may include one or more resistors and/or capacitors that may be selectively, electrically coupled across the antenna 504 to change the resonant frequency. In some implementations, the antenna 504 may be formed along the printed circuit board 402. The communications subsystem 502 may transmit and receive electrical signals via the antenna 504. Such transmission and reception may occur through one or more wired and/or wireless networks to which the communications subsystem 502 and antenna 504 may be communicatively coupled. Such a wireless network may transmit messages using one or more wireless communication protocols, such as, for example, Wi-Fi, Bluetooth, Bluetooth Low Energy, ZigBee, or any other acceptable wireless communication protocol. In some implementations, the antenna 504 may have a defined spatial range in which to communicate. In some implementations, for example, the defined spatial range of the antenna 504 may be less than 5 inches. As such, the antenna 504 may be capable of communicating with the hand-held processor-based terminal 200 only when the accessory 100 is close to the hand-held processor-based terminal 200, such as when the two are physically coupled together. In such an implementation, the antenna 504 may transmit signals to the hand-held processor-based terminal 200 using low power. Such low power transmissions may advantageously reduce the possibility that conflicts may arise between the signals transmitted by the communications subsystems 502 on multiple accessories 100.

Including the antenna 504 for use with a wireless communication protocol may advantageously be used to "upgrade" existing hand-held processor-based terminals 200 by attaching the accessory 100. Even though such a hand-held processor-based terminal 200 may not have been manufactured specifically for use with the accessory 100, and may therefor lack the interfaces to form a wired connection with the accessory 100, the antenna 504 will enable the accessory 100 to transmit data and information with the hand-held processor-based terminal 200. In addition to the use of the antenna 504, the accessory 100 may further include an internal power source (e.g., a battery) that may enable the accessory 100 to operate without drawing power from the hand-held processor-based terminal 200.

The power management subsystem 506 may be used to receive power from one or more sources, including local sources such as a battery 508 and/or a capacitor 510 that are located at the accessory 100, and including external sources, such as from the hand-held processor-based terminal 200. In some implementations, such as when one or more rechargeable power components are used, the power management subsystem 506 may be used to thereby charge the rechargeable power components, such as rechargeable batteries and/or supercapacitors. Such rechargeable power components may be used to supply power during a high-power demand operation such as burst radio transmission. In some implementations, in some instances, such as when the rechargeable power components are not sufficiently charged, the power management subsystem 506 may generate one or more signals that are received by the processor 500, and that may prevent the processor 500 from executing instructions for high-power demand operations. Alternatively, or in addition, the power management subsystem 506 may generate one or more signals to indicate that the rechargeable power components are sufficiently charged to provide power for a high-power demand operation. The power management subsystem 506 may be used to generate or otherwise supply the power used by the various components of the controller 106 and by the supplemental display 104. In such implementations, the power management subsystem 506 may include a step-up circuit to boost the voltage generated by low-voltage power sources (e.g., 1.2 Voltage Ni-MH coin cell batteries).

Figure 6:
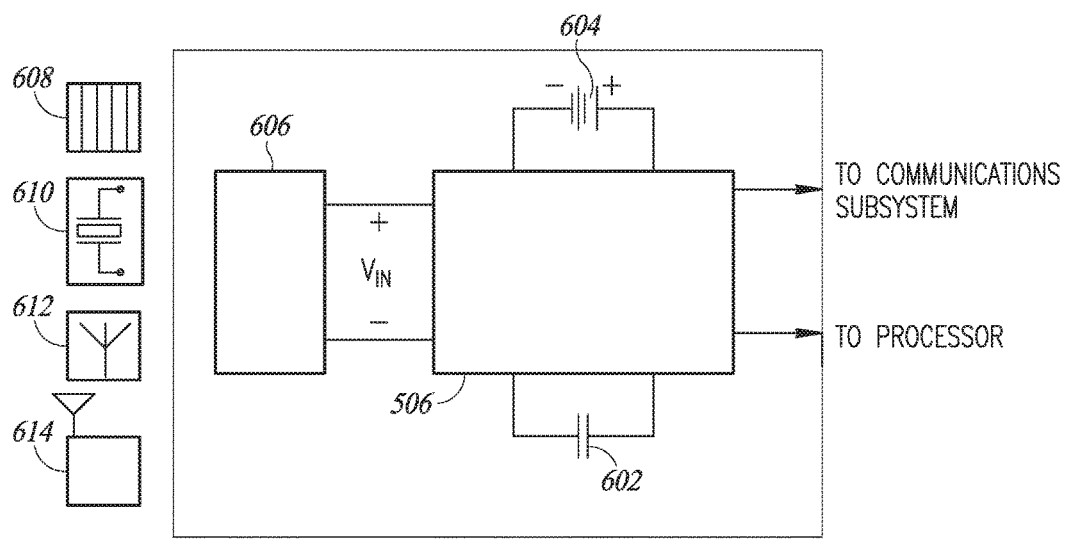
FIG. 6 is a block diagram that shows the power management subsystem and associated power sources, according to at least one illustrated implementation.

FIG. 6 shows a power management subsystem 506 and associated power sources, including a supercapacitor 602, a rechargeable battery 604, and a power generation circuit 606, according to at least one illustrated implementation. Such a power management subsystem 506 may be used, for example, when the accessory 100 is not electrically coupled to an external power source. In such an implementation, the power management subsystem 506 may receive power generated by the power generation circuit 606, and may store the received power in one or both of the supercapacitor 602 and the rechargeable battery 604. In such an implementation, the power generation circuit 606 may generate a trickle current that may be used to charge one or both of the supercapacitor 602 and/or the rechargeable battery 604. Such a trickle current may not be sufficient to continuously power the components on the accessory 100. As such, the power stored in the supercapacitor 602 and/or the rechargeable battery 604 may be used to provide power to the other components in the accessory 100.

In some implementations, such as when the power generation circuit 606 generates a limited amount of power, the power management subsystem 506 may be used to minimize the power consumption by the other components on the accessory 100. For example, in some implementations, the power management subsystem 506 may include a timer that is initiated each time the user input device 110 is activated to trigger a function, process, and/or operation. Such a timer may be used to prevent any further input from being received from the user input device 110 until the timer has expired, thereby limiting the amount of power that may be used in response to repeated activation of the user input device 110. In some implementations, the power management subsystem 506 may be used to increase the refresh rate on the supplemental display 104. Such an implementation may be particularly advantageous for supplemental displays 104 that use power only when refreshed, such as, for example, a cholesteric display. In some implementations, one or more of the processor 500, the communications subsystem 502, and the supplemental display 104 may be placed in a sleep mode to minimize the amount of power consumed. Such components may be periodically woken to process and/or transmit data before returning to the sleep mode. In some implementations, the controller 106 may include a real-time-clock that may be used to provide an interrupt signal to periodically wake up one or more such components. In some implementations, such a signal may be associated with a command to execute a function, process, or application present on the hand-held processor-enabled terminal 100. For example, in some implementations, such a signal may be associated with a command to capture an image by an image sensor 212 on the hand-held processor-enabled terminal 100.

In some implementations, the power generation circuit 606 may include a solar cell 608 that may be used to convert light into a current. Such a solar cell 608 may be placed along the first major surface 116 of the strap 102 such that the solar cell 608 may be exposed to light when the accessory 100 is physically coupled to the hand-held processor-based terminal 200. In some implementations, the power generation circuit 606 may include piezoelectric component 610 that may generate current when moved and/or deformed. Such movement may occur, for example, through the movement of the accessory 100 when the accessory 100 is physically coupled to and being used with the hand-held processor-enabled terminal 200. In some implementations, the power generation circuit 606 may include a temperature sensor 612 that may be used to harvest energy generated during wireless transmissions, such as may occur, for example, during Wi-Fi transmissions. In some implementations, the power generation circuit 606 may include a rectenna 614 that may be used to harvest energy from received wireless signals. Such a rectenna 614 may include an antenna tuned to receive incoming wireless transmissions, an impedance matching circuit, and a rectifier for the induced voltage that results from the incoming wireless transmission. The current harvested by the power generation circuit 606 may be stored by one or more of the supercapacitor 602 and/or the rechargeable battery 604. Such stored power in the supercapacitor 602 and/or the rechargeable battery 604 may be used to power the other components on the accessory 100.

Figure 7:
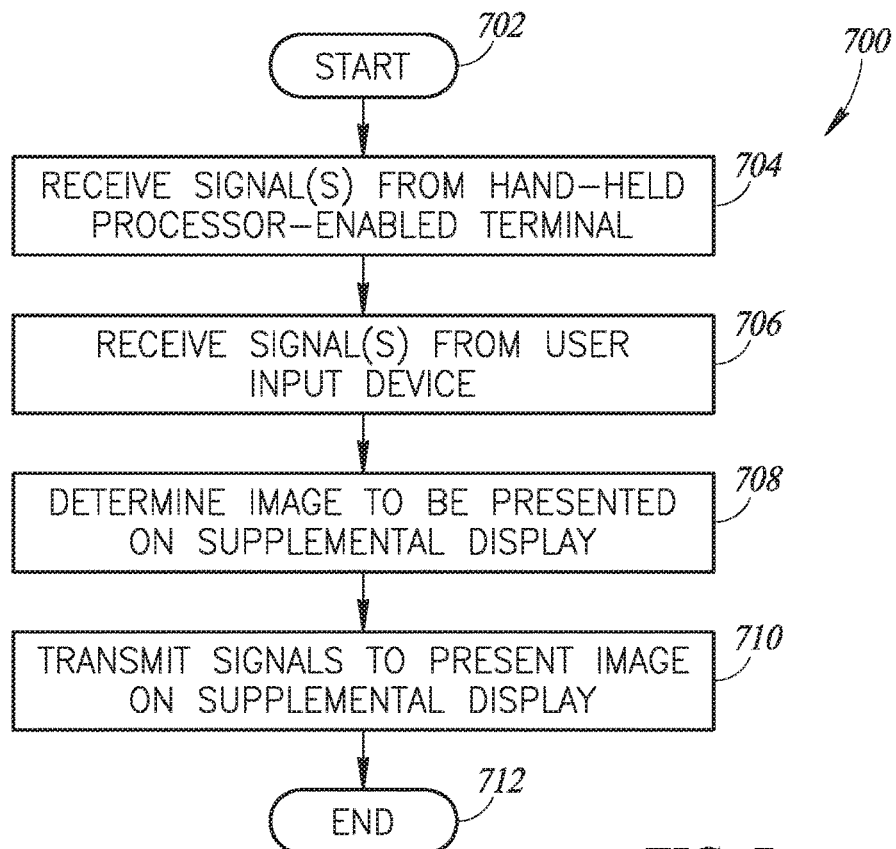
FIG. 7 is a logic flow diagram of a method of presenting information and/or data on the supplemental display, according to at least one illustrated implementation.

FIG. 7 shows a method 700 in which information and/or data is presented on the supplemental display 104 of the accessory 100, according to at least one illustrated implementation. The method 700 starts at 702, at which a processor-based device, for example the controller 106, receives one or more signals.

At 704, a processor-enabled component, such as the controller 106, may receive one or more signals from the hand-held processor-enabled terminal 200. Such signals may be received, for example, via a wireless and/or a wired network via the communications subsystem 502. In such implementations, the signals may be used to transmit information from the hand-held processor-enabled terminal 200 to the accessory 100. Such information may include, for example, identifying information for the hand-held processor-enable terminal 200, which may be presented on the supplemental display 200 when the accessory 100 is first communicatively coupled to the hand-held processor-enabled terminal 100. In some implementations, such signals may be include data or information captured or determined by the hand-held processor-enabled component. Such data or other information may include, for example, decoded information objected from an image that captured a machine-readable symbol.

At 706, a processor-enabled component, such as the controller 106, may receive one or more signals from the user input device 110. Such a signal may be generated, for example, from a user actuatable button 110a that may be carried along one of the surfaces of the strap 102. The user actuatable button 110a may include, for example, a push button, a rocker switch, or any other type of user actuatable button 110a that may be activated, for example, by the user, that may cause a signal to be transmitted from the user actuatable button 110a to the controller 106. In such an implementation, the signal may be generated when the associated user actuatable button 110a is activated (e.g., depressed) to electrically couple two electrical contacts. In some implementations, the user input device 110 may include a user actuatable button icon 110b that may be presented via the supplemental display 104. In such an implementation, the supplemental display 104 may include touch-screen capabilities that enable the supplemental display 104 to detect a selection by a user on at least a portion of the supplemental display 104. In some implementations, the signal received from the user input device 110 may indicate a command to change the images or other information displayed on the supplemental display 104. For example, such signals may be associated with respective commands to execute a scroll up or a scroll down operation that results in changing the image presented on the supplemental display 104.

At 708, a processor-enabled component, such as the controller 106, may determine the images, data, or other information to be presented on the supplemental display 104. In some implementations, the images, data, or other information to be presented on the supplemental display 104 may be based, at least in part, upon the one or more signals received from the hand-held processor-enabled terminal 200 at 704 and/or the one or more signals from the user input device 110 at 706.

At 710, a processor-enabled component, such as the controller 106, may transmit one or more signals to the supplemental display 104 to display the images, data, or other information determined at 708. The supplemental display 104 may be comprised of any type of electronically controllable display in which the one or more signals may be used to control and modify the images being rendered upon the supplemental display 104. In some implementations, for example, the supplemental display 104 may be comprised of a type of liquid crystal display ("LCD"), a type of light emitting diode ("LED") display such as an organic LED ("OLED") display or a MicroLED display, or any other type of electronically controllable screen, such as a dot matrix display screen. In some implementations, for example, the supplemental display 104 may be comprised of an electronic ink ("e-ink") display that may be used to provide images to the supplemental display 104 based upon one or more signals, such as those that might be received from the controller 106. In some implementations, the supplemental display 104 may be comprised of a cholesteric display that uses power only when the display is changed and/or refreshed. In some implementations, the one or more signals transmitted at 710 may control an LED display that may be used to highlight portions of the supplemental display 104, such as may occur, for example, to highlight an alarm being presented on the supplemental display 104.

At 712, the method 700 terminates, for example until invoked again. Alternatively, the method 700 may repeat continuously or repeatedly, or may execute as multiple instances of a multi-threaded process.

Figure 8:
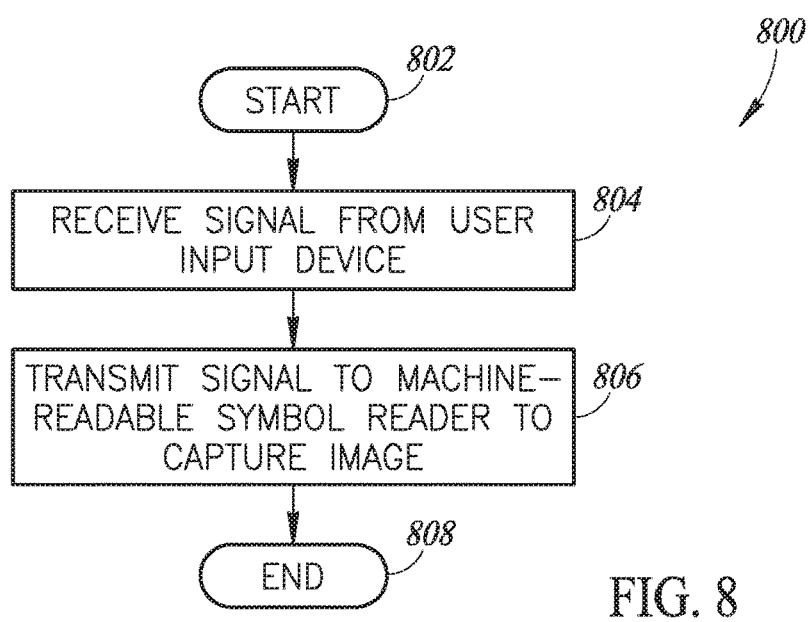
FIG. 8 is a logic flow diagram of a method of receiving an input from the user input device to trigger a machine-readable symbol reader on the hand-held processor-based terminal to capture an image of a machine readable symbol, according to at least one illustrated implementation.

FIG. 8 shows a method 800 of receiving an input from the user input device 110 to trigger a machine-readable symbol reader 212a on the hand-held processor-based terminal 200 to capture an image of a machine readable symbol, according to at least one illustrated implementation. The method 800 starts at 802, at which a processor-based device, for example the controller 106, receives one or more signals.

At 804, a processor-enabled component, such as the controller 106, may receive one or more signals from the user input device 110. Such a signal may be generated, for example, from a user actuatable button 110a that may be carried along one of the surfaces of the strap 102. The user actuatable button 110a may include, for example, a push button, a rocker switch, or any other type of user actuatable button 110a that may be activated, for example, by the user, that may cause a signal to be transmitted from the user actuatable button 110a to the controller 106. In such an implementation, the signal may be generated when the associated user actuatable button 110a is activated (e.g., depressed) to electrically couple two electrical contacts. In some implementations, the user input device 110 may include a user actuatable button icon 110b that may be presented via the supplemental display 104. In such an implementation, the supplemental display 104 may include touch-screen capabilities that enable the supplemental display 104 to detect a selection by a user on at least a portion of the supplemental display 104.

At 806, a processor enabled component, such as the controller 106, transmits one or more signals to the hand-held processor-enabled terminal 200 in response to receiving the one or more signals at 804. Such a transmission from the controller 106 may be made via the communications subsystem 502 that may provide for wired and/or wireless communication. In such an implementation, the hand-held processor-enabled terminal 200 may include an image sensor 212, such as a machine-readable symbol reader 212a, that may be used to capture one or more images within the field-of-view 214 of the image sensor 212. The signal transmitted by the controller 106 may result in the image sensor 212 being triggered to capture such an image that may include a representation of a machine-readable symbol. Such machine-readable symbols may be one-dimensional (e.g., barcode symbols) or two-dimensional machine-readable symbols (e.g., area or matrix code symbols). Machine-readable symbols are based on machine-readable symbologies (e.g., Code 39, Code 128, EAN13, Code 93, DataMatrix, PDF 417, QR Code) which define respective mappings between areas of high and low reflectance and human understandable characters (e.g., alphanumeric, extended ASCII). In some implementations, the hand-held processor-enabled terminal 200 may decode the representation of the machine-readable symbol captured within the image. In such implementations, the processor for the hand-held processor-based terminal 200 may transmit information to the controller 106 to be presented on the supplemental display 104 based upon the information decoded from the machine-readable symbol.

At 808, the method 800 terminates, for example until invoked again. Alternatively, the method 800 may repeat continuously or repeatedly, or may execute as multiple instances of a multi-threaded process.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

Accordingly, the claims are not limited by the disclosure.

The invention claimed is:

1. An accessory for use with one or more hand-held processor-based terminals that have a length and a width, a front with a primary display and a back, the accessory comprising:
  a strap, the strap having a first major face, a second major face, a length, and a width;
  a supplemental display carried by the strap and viewable from the first major face; and
  at least one user input device operable to produce a signal in response to activation thereof;
  a controller carried by the strap, the controller communicatively coupleable to the one or more hand-held processor-based terminals and which is communicatively coupled to the supplemental display to control presentation of information thereby; and
  a set of couplers carried by the strap spaced along the length thereof and via which the accessory is physically coupleable to one of the hand-held processor-based terminals with the second major face of the strap facing the back of the one of the hand-held processor-based terminals and the first major face of the strap facing outwardly from said one of the hand-held processor-based terminals with the supplemental display visible, where a portion of the length of the strap between the couplers of the set of couplers is sized to provide a gap between the second major face of the strap and the back of the one of the hand-held processor-based terminals when the strap is physically coupled to the one of the hand-held processor-based terminals, the gap sized to receive at least a portion of a limb of a user therein to provide a secure engagement between the strap and the hand-held processor-based terminal and the portion of the limb of the user.

2. The accessory of claim 1 wherein the at least one user input device is a user actuatable button.

3. The accessory of claim 1 wherein the at least one user input device is a user actuatable button icon displayed on the supplemental display.

4. The accessory of claim 1 wherein the at least one hand-held processor-based terminal is a machine-readable symbol reader, and in response to activation of the at least one user input device, the controller causes a signal to be sent to the machine-readable symbol reader that causes the machine-readable symbol reader to read a machine-readable symbol in a field-of-view of the machine-readable symbol reader.

5. The accessory of claim 1, further comprising:
  at least one wired communications interface that provides wired communications between the controller and the at least one hand-held processor-based terminal when the strap is physically coupled to the at least one hand-held processor-based terminal.

6. The accessory of claim 1, further comprising:
  at least one wireless communications interface that provides wireless communications between the controller and the at least one hand-held processor-based terminal when the strap is within a defined spatial range of the at least one hand-held processor-based terminal.

7. The accessory of claim 1 wherein the set of couplers detachably couple the strap to the one of the hand-held processor-based terminals.

8. The accessory of claim 1, further comprising:
  at least two contacts, the at least two contacts located opposite each other across the length of the strap, the at least two contacts which are electrically coupleable with corresponding contacts on the terminal.

9. The accessory of claim 8 wherein the at least two contacts include an inductive charging interface.

10. The accessory of claim 9 wherein each of the at least two contacts is electrically coupled with the electronic display via a respective electrically conductive wire, the electrically conductive wire which has a wire length, the wire length which is greater than a distance from the respective contact to a proximal edge of the controller.

11. The accessory of claim 10 wherein the electrically conductive wire makes a trace from the respective contact to the controller, the trace which includes at least one turn.

12. The accessory of claim 10 wherein the electrically conductive wire is comprised of a conductive elastomer.

13. The accessory of claim 1, further comprising:
  a power management circuit, the power management circuit which is electrically coupled to the controller.

14. The accessory of claim 13 wherein the power management circuit includes at least one of a battery, a capacitor, and a power generation circuit.

15. The accessory of claim 14 wherein the power generation circuit is comprised of at least one of a solar cell, a piezoelectric circuit, and a thermoelectric circuit.

16. The accessory of claim 1 wherein the information presented on the supplemental display includes at least one of a battery status, data regarding an operator of the terminal, and one or more alarms.

17. A hand-held processor-based terminal device, the device comprising:
  a hand-held processor-based terminal that has a length and a width, a front with a primary display and a back; and
  an accessory, the accessory comprising:
    a strap, the strap having a first major face, a second major face, a length, and a width;

a supplemental display carried by the strap and viewable from the first major face; and at least one user input device operable to produce a signal in response to activation thereof;

a controller carried by the strap, the controller communicatively coupleable to the one or more hand-held processor-based terminals and which is communicatively coupled to the supplemental display to control presentation of information thereby; and a set of couplers carried by the strap spaced along the length thereof and via which the accessory is physically coupleable to one of the hand-held processor-based terminals with the second major face of the strap facing the back of the one of the hand-held processor-based terminals and the first major face of the strap facing outwardly from said one of the hand-held processor-based terminals with the supplemental display visible, where a portion of the length of the strap between the couplers of the set of couplers is sized to provide a gap between the second major face of the strap and the back of the one of the hand-held processor-based terminals when the strap is physically coupled to the one of the hand-held processor-based terminals, the gap sized to receive at least a portion of a limb of a user therein to provide a secure engagement between the strap and the hand-held processor-based terminal and the portion of the limb of the user.

18. A method of operation of an accessory that presents information using a supplemental display on an accessory, the accessory which is physically coupled to a hand-held processor-based terminal that has a length and a width, a front with a primary display and a back, and a processor, wherein the accessory includes a strap, the supplemental display, a controller, and a set of couplers carried by the strap, the strap having a first major face, a second major face, a length, and a width, the strap being physically coupled to the hand-held processor-based terminal via the set of couplers, the set of couplers spaced along the length of the strap such that a portion of the length of the strap between the couplers of the set of couplers is sized to provide a gap between the second major face of the strap and the back of the hand-held processor-based terminal, with the first major face of the strap facing outwardly from the hand-held processor-based terminal and carrying the supplemental display to be visible, the method comprising:

receiving, by the gap between the second major face of the strap and the back of the hand-held processor-based terminal, a portion of a limb of a human user;

thereafter, receiving by the controller on the accessory one or more signals transmitted from the processor in the hand-held processor-based terminal;

determining one or more images to be presented on the supplemental display based at least in part upon the received one or more signals; and transmitting one or more signals to the supplemental display, the one or more signals which cause the determined image to be presented by the supplemental display.

19. The method of claim 18 wherein the accessory further includes a user input device, the method further comprising:

receiving by the controller on the accessory a signal transmitted by the user input device; and determining one or more images to be presented on the supplemental display based at least in part upon signal received from the user input device.

20. The method of claim 18 wherein the accessory further includes a machine-readable symbol reader and a user input device, the method further comprising:

receiving by the controller on the accessory a signal transmitted by the user input device; and transmitting a signal to the machine-readable symbol reader that causes the machine-readable symbol reader to read a machine-readable symbol in a field-of-view of the machine-readable symbol reader.

* * * * *